United States Patent
Hong et al.

(10) Patent No.: US 9,693,294 B2
(45) Date of Patent: Jun. 27, 2017

(54) METHOD AND APPARATUS FOR SELECTING CELL OF TERMINAL IN WIRELESS COMMUNICATION SYSTEM

(71) Applicant: Samsung Electronics Co., Ltd., Suwon-si, Gyeonggi-do (KR)

(72) Inventors: Seungwook Hong, Suwon-si (KR); Kihyun Do, Yongin-si (KR); Jonghan Kim, Yongin-si (KR); Yongduk Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 14/324,658

(22) Filed: Jul. 7, 2014

(65) Prior Publication Data

US 2015/0011225 A1    Jan. 8, 2015

Related U.S. Application Data

(60) Provisional application No. 61/843,010, filed on Jul. 4, 2013.

(30) Foreign Application Priority Data

Jan. 3, 2014    (KR) .................. 10-2014-0000535

(51) Int. Cl.
*H04W 36/00* (2009.01)
*H04W 48/20* (2009.01)

(52) U.S. Cl.
CPC .................. *H04W 48/20* (2013.01)

(58) Field of Classification Search
CPC ..... H04W 48/12; H04W 48/16; H04W 48/18; H04W 48/20; H04W 88/06; H04W 36/30; H04W 36/18; H04W 36/08; H04W 36/14; H04W 36/32; H04W 64/00; H04W 4/22; H04W 76/028; H04W 36/16; H04W 76/007; H04W 36/0022; H04W 24/08; H04W 16/18; H04W 24/10; H04W 4/021; H04W 68/00; H04M 11/04
USPC ... 455/404.1, 404.2, 432.1, 434, 436, 437.1, 455/440
See application file for complete search history.

(56) References Cited

U.S. PATENT DOCUMENTS

| | | | |
|---|---|---|---|
| 6,516,190 B1 | 2/2003 | Linkola | |
| 2005/0048982 A1* | 3/2005 | Roland | H04W 48/16 455/449 |
| 2005/0079870 A1* | 4/2005 | Rick | H04W 60/04 455/437 |
| 2005/0148349 A1 | 7/2005 | Putcha et al. | |

(Continued)

FOREIGN PATENT DOCUMENTS

| KR | 10-2010-0118941 A | 11/2010 |
|---|---|---|
| KR | 10-2011-0054381 A | 5/2011 |

*Primary Examiner* — Mahendra Patel
(74) *Attorney, Agent, or Firm* — Jefferson IP Law, LLP

(57) ABSTRACT

A method and an apparatus for selecting a cell of a terminal in a wireless communication system are provided. The method includes detecting, by the terminal, an end of a call, performing, when an end of the call is detected, a cell search based on a cell used during the call, the cell search being performed among at least one cell having been used before the call by the terminal and a cell used just before forming the call, and determining a cell to which the cell selection is performed, based on a result of the cell search and the cell used just before forming the call.

11 Claims, 7 Drawing Sheets

(56) References Cited

U.S. PATENT DOCUMENTS

| | | | |
|---|---|---|---|
| 2006/0056347 A1 | 3/2006 | Kwak et al. | |
| 2010/0159928 A1* | 6/2010 | Wu | H04W 48/16 455/435.2 |
| 2010/0159929 A1* | 6/2010 | Homchaudhuri | H04W 68/02 455/436 |
| 2010/0255807 A1* | 10/2010 | Umatt | H04W 4/22 455/404.1 |
| 2011/0244870 A1* | 10/2011 | Lee | H04W 52/244 455/444 |
| 2012/0044867 A1 | 2/2012 | Faccin et al. | |
| 2012/0046040 A1* | 2/2012 | Chatterjee | H04W 24/10 455/456.1 |
| 2012/0135715 A1* | 5/2012 | Kang | H04W 8/183 455/412.1 |
| 2012/0258681 A1* | 10/2012 | Hanover | H04W 4/02 455/404.2 |
| 2012/0309338 A1* | 12/2012 | Yli-Tuomi | H04L 12/6418 455/404.1 |
| 2013/0044613 A1 | 2/2013 | Edara et al. | |
| 2013/0053045 A1 | 2/2013 | Chuang | |
| 2013/0114566 A1* | 5/2013 | Awoniyi | H04W 36/0083 370/331 |
| 2013/0115951 A1 | 5/2013 | Deng et al. | |

\* cited by examiner

FIG. 4A

TERMINAL STORAGE UNIT DATABASE                              Last LAC = B

| 1 | | 2 | | ... | | 20 | | ... | | N | |
|---|---|---|---|---|---|---|---|---|---|---|---|
| Freq | 1 | Freq | 2 | | | Freq | 3 | | | | |
| PSC | 1 | PSC | 2 | | | PSC | 3 | | | | |
| LAC | A | LAC | B | | | LAC | B | | | | |

CELL SEARCH

FIG. 4B

| 1 | | 2 | | 20 | |
|---|---|---|---|---|---|
| Freq | 1 | Freq | 2 | Freq | 3 |
| PSC | 1 | PSC | 2 | PSC | 3 |
| LAC | A | LAC | B | LAC | B |
| Power | 10 | Power | 5 | Power | 7 |

TERMINAL STORAGE UNIT DATABASE                                  Last LAC = B

| 1 | | 2 | | ... | 20 | | ... | N |
|---|---|---|---|---|---|---|---|---|
| Freq | 1 | Freq | 2 | | Freq | 3 | | |
| PSC | 1 | PSC | 2 | | PSC | 3 | | |
| LAC | C | LAC | D | | LAC | D | | |

↓

CELL SEARCH

| 1 | | 2 | | 20 | |
|---|---|---|---|---|---|
| Freq | 1 | Freq | 2 | Freq | 3 |
| PSC | 1 | PSC | 2 | PSC | 3 |
| LAC | C | LAC | D | LAC | D |
| Power | 10 | Power | 5 | Power | 7 |

METHOD AND APPARATUS FOR SELECTING CELL OF TERMINAL IN WIRELESS COMMUNICATION SYSTEM

CROSS-REFERENCE TO RELATED APPLICATION(S)

This application claims the benefit under 35 U.S.C. §119(e) of a U.S. Provisional application filed on Jul. 4, 2013 in the U.S. Patent and Trademark Office and assigned Ser. No. 61/843,010, and under 35 U.S.C. §119(a) of a Korean patent application filed on Jan. 3, 2014 in the Korean Intellectual Property Office and assigned Serial number 10-2014-0000535, the entire disclosure of each of which is hereby incorporated by reference.

TECHNICAL FIELD

The present disclosure relates to a wireless communication system. More particularly, the present disclosure relates to a method and an apparatus for selecting a cell of a terminal in a wireless communication system.

BACKGROUND

In general, a mobile communication system was developed to provide voice services while guaranteeing activity of users. However, the mobile communication system has gradually expanded its service area up to a data service as well as a voice service and has been developed to provide a high speed data service at present. Though, since resources are lacking and since users demand higher speed services in the mobile communication system providing a current service, a more improved mobile communication system is needed.

In general, a terminal selects a last cell used during a Circuit Switched (CS) call, after ending the call. For example, when a Location Area Code (LAC) of a cell where the call is firstly formed and the LAC of the cell where the call is ended are different, the terminal performs a location area update to a new cell.

When the terminal performs the location area update procedure, a paging with respect to the terminal is not received while the procedure is performed. Therefore, the terminal cannot receive another call, while performing the location area update just after ending the call.

Thus, a user should suffer inconvenience of missing a received call.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus capable of resolving a user's inconvenience of missing a received call owing to a performance of a location area update procedure after ending of a call of a terminal.

Another aspect of the present disclosure is to provide a method and an apparatus for searching all cells of which a camp-on is performed by a terminal after a call is ended, and for selecting a cell of which the camp-on is performed in the past, when information with respect to a cell of which a reception signal strength is the best is identical to information with respect to a cell on which the camp-on is performed before forming the call.

In accordance with an aspect of the present disclosure, a method for selecting a cell of a terminal in a wireless communication system is provided. The method includes detecting, by the terminal, an end of a call, performing, when the end of the call is detected, a cell search based on a cell used during the call, the cell search being performed among at least one cell having been used before the call by the terminal and a cell used just before forming the call, and determining a cell to which the cell selection is performed, based on a result of the cell search and the cell used just before forming the call.

In accordance with another aspect of the present disclosure, a terminal for selecting a cell in a wireless communication system is provided. The terminal includes a wireless communication unit configured to perform a wireless communication with a base station, a storage unit configured to store information of at least one cell, and a control unit configured to, when an end of a call is detected, perform a cell search based on a cell used during the call, the cell search being performed among at least one cell having been used before the call by the terminal and a cell used just before forming the call, and to determine, based on a result of the cell search and the cell used just before the call, a cell to which the cell selection is performed.

According to the present disclosure, at a call ending, a location area update procedure due to a change of location area code information may be minimized. Thus, the present disclosure may decrease user's inconvenience of missing a received call due to the location area update procedure performance.

In addition, the present disclosure may minimize the location area update procedure consuming power a lot, and thus may decrease power consumption of a battery of the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which:

FIGS. 4A and 4B illustrate an example of a cell selection process according to various embodiments of the present disclosure;

Throughout the drawings, it should be noted that like reference numbers are used to depict the same or similar elements, features, and structures.

DETAILED DESCRIPTION

Figure 1:
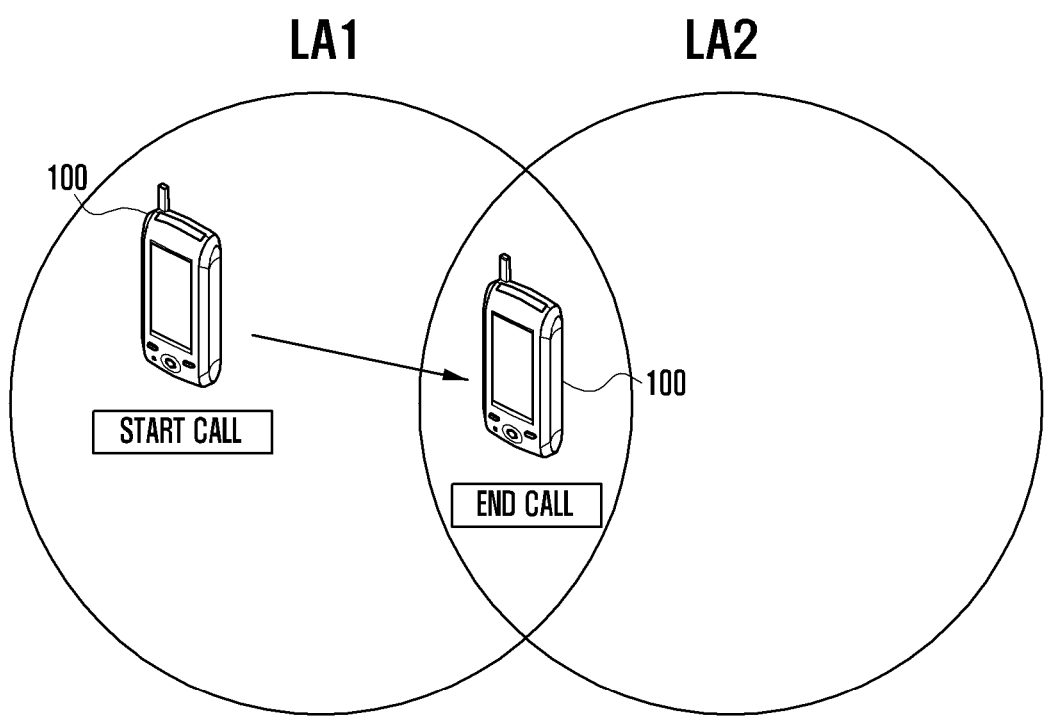
FIG. 1 illustrates a performance of a location area update procedure after a call of a terminal is ended according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to various embodiments as described below in detail in conjunction with the accompanying drawings. However, the present disclosure is not limited to the various embodiments set forth below, but may be implemented in various different forms. The following various embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more Central Processing Units (CPUs) within a device or a security multimedia card.

Hereinafter, terms described in the various embodiments of the present disclosure are schematically described.

A location area may mean a unit providing a call to a terminal in a network, that is, the location area may mean a unit performing a paging. According to an embodiment of the present disclosure, the location area may include a plurality of cells.

Location area code information may mean an identifier assigned to the location area. According to an embodiment of the present disclosure, the location area code information may be a Location Area Code (LAC). Hereinafter, the LAC and the location area may be mutually mixed.

FIGS. 1 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a performance of a location area update procedure after a call of a terminal is ended according to an embodiment of the present disclosure.

Referring to FIG. 1, a case wherein a terminal 100 starts a call in a cell of Location Area 1 (LA1) and ends the call after the terminal 100 moves to an overlapping area of LA1 and Location Area 2 (LA2) is illustrated.

In this case, generally the terminal 100 performs a camp-on to a cell included in LA2 to perform the location area update procedure. In a case where the location area update procedure is performed, when a paging with respect to the terminal 100 is received, the terminal cannot receive the paging.

In the present disclosure, in order to resolve the above-mentioned problems, operations below are suggested.

Firstly, the terminal 100 may store information of all cells on which a camp-on is performed by the terminal 100. The information with respect to the cell may include at least one of a frequency, Universal Terrestrial Radio Access (UTRA) Absolute Radio Frequency Channel Number (UARFCN) information and Primary Scramble Code (PSC) information with respect to the cell. In addition, when the terminal 100 forms the call, the terminal 100 may store information with respect to a cell on which the camp-on is performed just before forming the call.

Also, after the call is ended, the terminal 100 performs a cell search with respect to all of a cell used during the call, all cells on which the camp-on is performed by the terminal 100, and the cell used just before the call.

And, as a result of the cell search, when the LAC of the cell of which a reception signal strength is the best is identical to the LAC of the cell used before forming the call, the terminal selects the cell of which the reception signal strength is the best.

Figure 2:
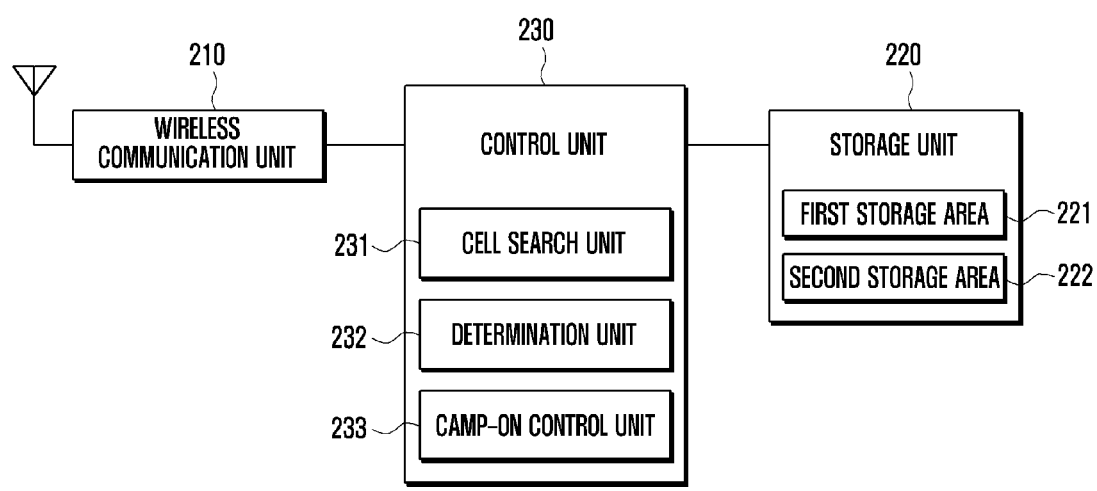
FIG. 2 is a block diagram illustrating an internal structure of a terminal according to an embodiment of the present disclosure.

FIG. 2 is a block diagram illustrating an internal structure of a terminal according to an embodiment of the present disclosure.

Referring to FIG. 2, a terminal according to the present disclosure is illustrated, the terminal may include a wireless communication unit 210, a storage unit 220, and a control unit 230.

The wireless communication unit 210 performs a transmission or reception of data for wireless communication of the terminal. The wireless communication unit 210 may include a Radio Frequency (RF) transmitter for up-converting and amplifying a frequency of a transmitted signal and an RF receiver for low noise-amplifying a received signal and down-converting a frequency. Further, the wireless communication unit 210 may receive data through a wireless channel to output the received data to the control unit 230, and may transmit data output from the control unit 230 through the wireless channel.

The storage unit 220 may store a program and data required for operations of the terminal and may be divided into a program region and a data region. The program region may store a program controlling overall operations of the terminal, an Operating System (OS) booting the terminal, an application program required for playing multimedia contents, an application program required in other optional functions, e.g., a camera function, a voice playing function, an image or a video playing function, of the terminal, etc. The data region may be a region that stores data generated as a terminal is utilized, and may store an image, a video, a phone book, audio data, and the like.

According to an embodiment, the storage unit 220 may include a first storage area 221 and a second storage area 222.

The first storage area 221 may include the information of the cells to which the terminal has performed the camp-on. The information may include at least one of the frequency, UARFCN information and PSC information with respect to the cell.

The second storage area 222 stores the information with respect to the cell connected just before starting the call of the terminal. Also, the second storage area 222 may include the information with respect to the cell connected at a time point when the call of the terminal is formed. The call may be a CS call.

The cells stored in the first storage area 221 and the second storage area 222 are set as candidates to which the cell search is performed after the call of the terminal is ended.

The control unit 230 controls overall operations with respect to each of configuration elements of the terminal. Specifically, the control unit 230 may control a series of processes such as performing the cell search and selecting the cell according to an embodiment of the present disclosure after the call is ended. To this end, the control unit 230 according to an embodiment of the present disclosure may further include a cell search unit 231, a determination unit 232 and a camp-on control unit 233.

The cell search unit 231 detects an end of the call of the terminal. Also, when the cell search unit 231 detects the end of the call, the cell search unit 231 controls to search the cells stored in the first storage area 221 and the cells stored in the second storage area 222. In this case, the cell stored in the first storage area 221 includes all the cells to which the terminal has performed the camp-on in the past, and the cell stored in the second storage unit 222 includes the cell connected just before forming the call of the terminal.

The determination unit 232 determines a cell to which a cell selection is performed based on a result of the cell search. For example, the determination unit determines whether the LAC of the cell of which the reception signal strength is the strongest is identical to the LAC of the cell connected just before forming the call, based on the result of the cell search. When the LAC of the cell of which the reception signal strength is the strongest is identical to the LAC of the cell connected just before forming the call, the cell selection procedure is performed on the cell, of which the reception signal strength is the strongest, that is, the cell connected just before forming the call.

In contrast, when the LAC of the cell of which the reception signal strength is the strongest is not identical to the LAC of the cell connected just before forming the call, the determination unit 232 determines whether there is a cell having an LAC identical to the LAC of the cell stored in the second storage area 222 among the searched cells, based on the information stored in the first storage area 221. When there is the cell having the LAC identical to the LAC of the cell stored in the second storage area 222, the cell having the LAC identical to the LAC of the cell stored in the second storage area 222 is determined as a target of the cell selection.

Also, according to an embodiment of the present disclosure, the determination unit 232 may determine the cell to be selected according to whether the cell has a signal strength strong enough to perform the cell selection.

The camp-on control unit 233 performs the camp-on on the cell determined as the target of the cell selection, according to a determination result of the determination unit 232.

In the above, it is described that the control unit 230 includes a plurality of function blocks, and the control unit and each of the function blocks perform different functions. But, the present disclosure is not limited thereto. For example, the function performed by the determination unit 232 may be performed by the control unit 230.

Figure 3:
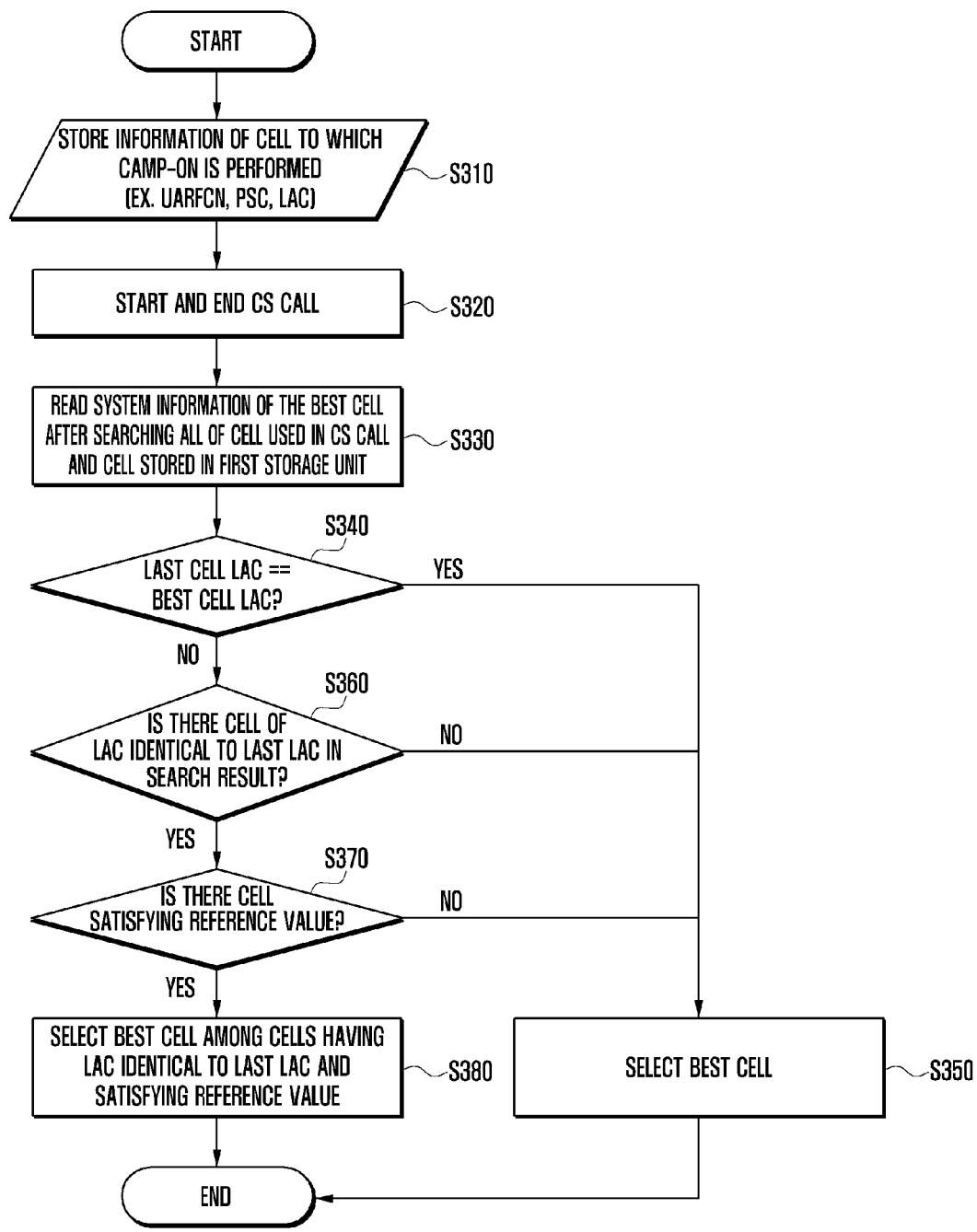
FIG. 3 is a flowchart illustrating a cell selection process of a terminal according to an embodiment of the present disclosure.

FIG. 3 is a flowchart illustrating a cell selection process of a terminal according to an embodiment of the present disclosure.

Referring to FIG. 3, a cell selection process is illustrated, where information with respect to a cell on which a camp-on is performed is stored, in operation S310. In this operation S310, a terminal may store the information with respect to cells on which the camp-on is performed after a product is released, or may store the information with respect to the cells on which the camp-on is performed in a state wherein a power of the terminal is turned on. Alternatively, the terminal may store only information with respect to a set number of the cells. Besides, according to various embodiments, the terminal may store the information of the cells on which the camp-on is performed.

The information with respect to the cell stored by the terminal may include at least one of the frequency, (UAR-FCN information and PSC information with respect to the cell.

Next, the terminal may start the call and end the call, in operation S320. The call may include the CS call.

Next, the terminal performs the cell search, in operation S330. In this operation S330, the terminal may perform the cell search to all of the cell used during the call and the cells stored in the first storage area 221. Next, the terminal obtains system information of the cell of which the reception signal strength is the strongest (e.g., a "best cell"), as the result of the cell search performance.

Next, the terminal determines whether the LAC of the cell of which the reception signal strength is the strongest (e.g., the "best cell") is identical to the LAC of the cell connected before forming the call, in operation S340. When the LAC of the cell of which the reception signal strength is the strongest (e.g., the "best cell") is identical to the LAC of the cell connected before forming the call (e.g., "YES" in operation S340), the terminal performs the cell selection procedure targeting the cell, of which the reception signal strength is the strongest (e.g., the "best cell"), that is, the cell connected before forming the call, in operation S350.

In contrast, when the LAC of the cell of which the reception signal strength is the strongest (e.g., the "best cell") is not identical to the LAC of the cell connected before forming the call (e.g., "NO" in operation S340), the terminal determines whether the LAC equal to the LAC of the cell connected before forming the call is included in the result of the cell search performed in operation S360. When the LAC equal to the LAC of the cell connected before forming the call is not included in the result of the cell search (e.g., "NO" in operation S360), the terminal performs the cell selection procedure targeting the cell of which the reception signal strength is the strongest (e.g., the "best cell"), in operation S350.

In contrast, when the LAC equal to the LAC of the cell connected before forming the call is included in the result of the cell search (e.g., "YES" in operation S360), the terminal determines whether there is a cell satisfying a reference value, among the cells satisfying the above-mentioned reference, in operation S370. For example, when there is at least one cell having the LAC identical to the LAC of the cell connected before forming the call in the result of the cell search performed in operation S330, the terminal may determine whether there is a cell having a predetermined strength of the reception signal strength.

When the cell having the LAC equal to the LAC of the cell connected before forming the call is not included in the result of the cell search performed in operation S330 (e.g., "NO" in operation S370), the terminal performs the cell selection procedure targeting the cell of which the reception signal strength is the strongest (e.g., the "best cell"), in operation S350.

In contrast, when there is at least one cell satisfying the reference value (e.g., "YES" in operation S370), the terminal performs the cell selection procedure targeting the cell of which the reception signal strength is the strongest (e.g., the "best cell"), among the cells satisfying the reference value, in operation S380.

FIGS. 4A and 4B illustrate an example of a cell selection process according to various embodiments of the present disclosure.

Referring to FIG. 4A, a table (e.g., a terminal storage unit database) showing information with respect to cells on which a camp-on is performed until a call is formed is illustrated. Here, the information is stored in the first storage area 221. As shown in FIG. 4A, a terminal may record a frequency (Freq), primary scrambling code (PSC) information, location area code (LAC) information, and the like with respect to each of the cells (e.g., cell 1, cell 2, . . . cell N). In FIG. 4A, a database (e.g., the terminal storage unit database) storing information with respect to N number of cells on which the camp-on is performed is illustrated.

In addition, it is assumed that the LAC of the cell connected just before forming the call of the terminal is B.

Next, when the call of the terminal is ended, the terminal performs the cell search including the cells shown in FIG. 4A. A result of the cell search is shown in FIG. 4B. Referring to FIG. 4B, the information of each of the searched cells is recorded, and specifically, the information may include the Freq, the PSC information, the LAC information, reception signal strength (Power), and the like of the searched cell.

Next, the terminal compares the LAC of a first cell of which the reception signal strength is the strongest with the LAC of the cell connected just before the call. As a result of the comparison, the terminal identifies that A which is the LAC of the first cell of which the reception signal strength is the strongest and B which is the LAC of the cell connected just before the call are different.

Next, the terminal determines whether a cell having the LAC identical to B which is the LAC of the cell connected just before the call is included in the result of the cell search. As illustrated in FIG. 4B, the LAC of the second cell and the LAC of a twentieth cell is B, and thus the terminal may determine the second cell and a third cell as the target to perform the cell selection.

Next, the terminal may perform the cell selection procedure targeting the twentieth cell, of which the reception signal strength is stronger than that of the second cell, among the second cell and the twentieth cell.

Figures 5A, 5B:
FIGS. 5A and 5B illustrate other examples of a cell selection process according to various embodiments of the present disclosure.

FIGS. 5A and 5B illustrate another example of a cell selection process according to various embodiments of the present disclosure.

Referring to FIG. 5A, a table (e.g., a terminal storage unit database) showing information with respect to cells on which a camp-on is performed until a call is formed is illustrated. Here, the information is stored in the first storage area 221. As shown in FIG. 5A, a terminal may record a frequency (Freq), primary scrambling code (PSC) information, location area code (LAC) information, and the like with respect to each of the cells (e.g., call 1, cell 2, . . . cell N). In FIG. 5A, a database (e.g., the terminal storage unit database) storing the information with respect to the N number of cells on which the camp-on is performed is illustrated.

In addition, it is assumed that the LAC of the cell connected just before forming the call of the terminal is B.

Next, when the call of the terminal is ended, the terminal performs the cell search including the cells shown in FIG. 5A. A result of the cell search is shown in FIG. 5B. Referring to FIG. 5B, the information of each of the searched cells is recorded, and specifically, the information may include the Freq, the PSC information, the LAC information, reception signal strength (Power), and the like of the searched cell.

Next, the terminal compares the LAC of the first cell of which the reception signal strength is the strongest with the LAC of the cell connected just before the call. As a result of the comparison, the terminal identifies that C which is the LAC of the first cell of which the reception signal strength is the strongest and B which is the LAC of the cell connected just before the call are different.

Next, the terminal determines whether the cell having the LAC identical to B which is the LAC of the cell connected just before the call is included in the result of the cell search. As illustrated in FIG. 5B, the cell having the LAC identical to B which is the LAC of the cell connected just before the call is not included in the result of the cell search.

In this case, the terminal may perform the cell selection process targeting the first cell of which the reception signal strength is the strongest.

Hereinafter, in the case of the above-mentioned embodiment of the present disclosure, how the cell selection process is changed according to a moving route of the terminal is described.

Figure 6:
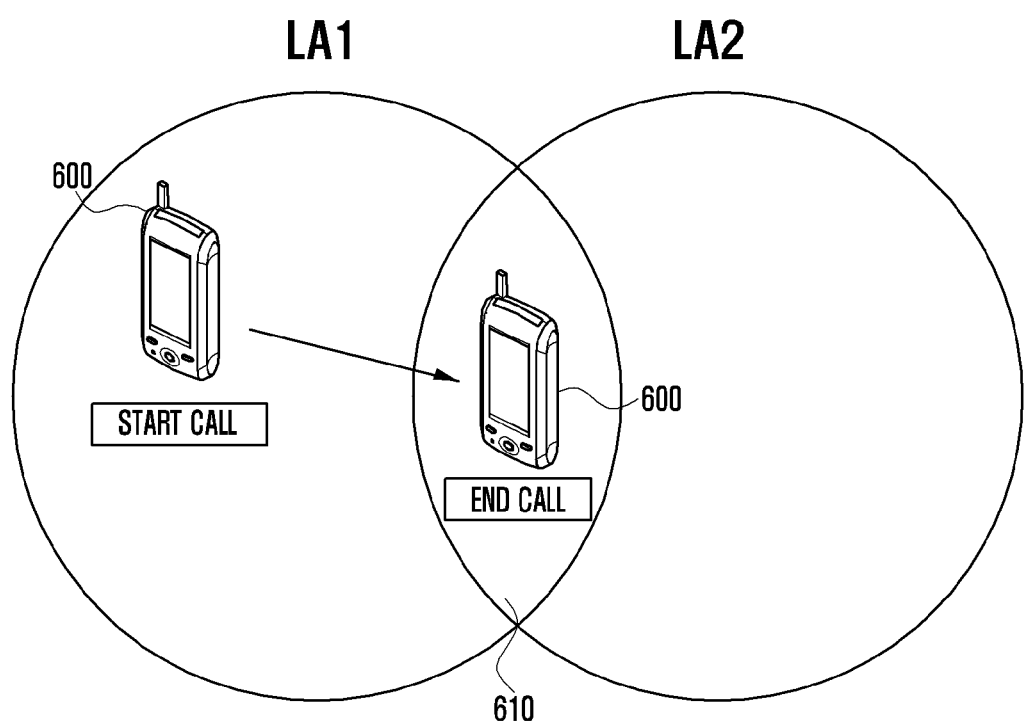
FIG. 6 illustrates a terminal performing a cell selection according to an embodiment of the present disclosure.

FIG. 6 illustrates that a terminal performs a cell selection according to an embodiment of the present disclosure.

Referring to FIG. 6, a terminal 600 that starts a call in an area LA1, moves toward an area LA2, and ends the call in an overlapping area 610 of the LA1 and the LA2, after performing a Hand Over (HO) to a cell in the LA2 is illustrated.

In this case, in related art, a location area update (LU) procedure is performed by performing the camp-on on the cell included in the LA2. However, at this time, when the paging for a reception call is input, the terminal cannot receive the paging, and thus there is a concern of missing the reception call.

In contrast, according to an embodiment of the present disclosure, because the terminal 600 searches a cell having an LAC identical to an LAC of the LA1 by also performing the cell search on the cells to which the camp-on had been performed in the past and performs the camp-on on the cell, the LU procedure is not generated. Thus, when the paging is received at the same time, the corresponding paging may be received, and thus the reception call miss is not generated.

Summarizing a result according to FIG. 6, table 1 below is obtained.

TABLE 1

| | LU Procedure | Reception Call Miss Probability |
|---|---|---|
| The Related Art | ○ | High |
| The Present Disclosure | X | Low |

Figure 7:
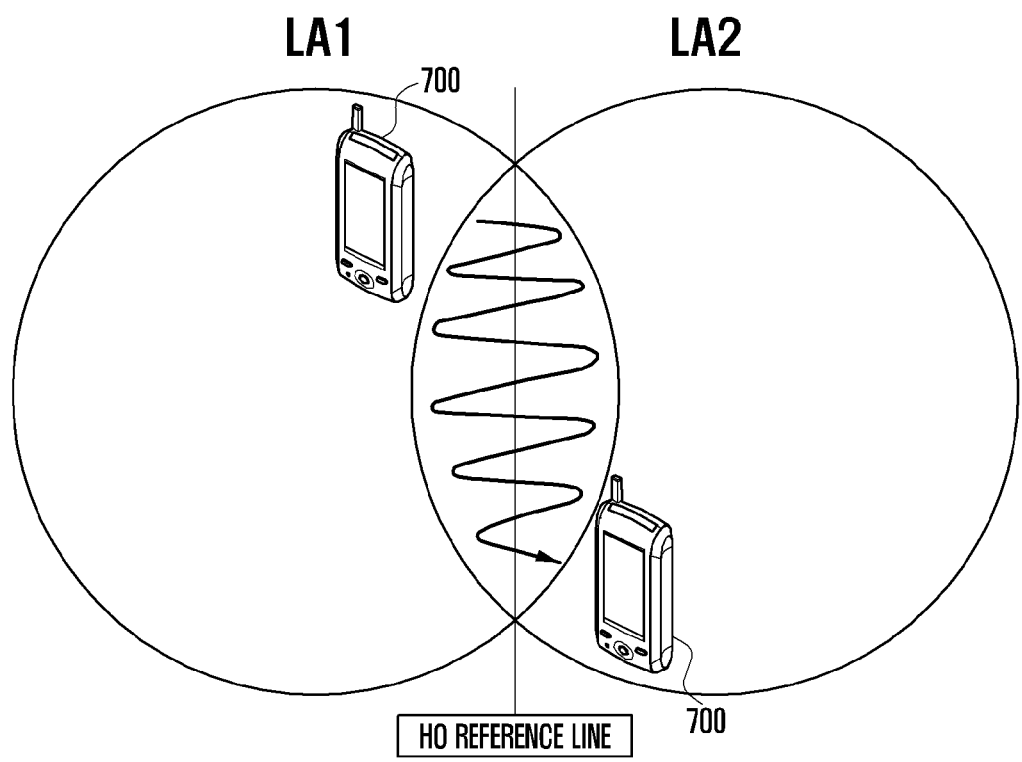
FIG. 7 illustrates a terminal performing a cell selection according to an embodiment of the present disclosure.

FIG. 7 illustrates that a terminal performs a cell selection according to an embodiment of the present disclosure.

Referring to FIG. 7, a terminal 700 repeats operations of starting and ending a call while moving in an overlapping area of LA1 and LA2, in a situation equal to the situation of FIG. 6.

In a case wherein a user moves in the overlapping area of the LA1 and the LA2, when the terminal repeats the operations of starting and ending the call while passing an HO reference line, in the related art, the LU procedure is repeatedly generated on all such occasions, and thus a frequency of the reception call miss becomes higher.

In contrast, according to an embodiment of the present disclosure, the cell selection is performed with respect to the cell which had been located in a previous LA so as not to perform the LU procedure, and thus the reception call miss is not generated.

In addition, the LU procedure is not performed, and thus unnecessary battery consumption may be lower.

Summarizing a result according to FIG. 7, table 2 below is obtained.

TABLE 2

| | LU Procedure | Reception Call Miss Probability |
|---|---|---|
| The Related Art | ○ | Very high |
| The present Disclosure | X | Low |

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for selecting a cell by a terminal in a wireless communication system, the method comprising:
   storing information on at least one cell having been used before a call and a cell used just before forming the call;
   performing, if an end of the call is detected, a cell search based on a cell used during the call and the stored information on the at least one cell having been used before a call and a cell used just before forming the call;

determining the cell to which the cell selection is performed, based on a result of the cell search and the cell used just before forming the call, the determining of the cell comprising:
comparing first location area information of a cell of which a reception signal strength is the strongest according to the result of the cell search with second location area information of the cell used just before forming the call, and
determining the cell of which the reception signal strength is the strongest as the cell to which the cell selection is performed, if the first location area information is identical to the second location area information, as a result of the comparison; and
selecting, by the terminal, the determined cell.

2. The method of claim 1, further comprising:
determining whether a cell having third location area information identical to the second location area information is included in the result of the cell search, if the first location area information is not identical to the second location area information, as the result of the comparison; and
determining the cell of which the reception signal strength is the strongest as the cell to which the cell selection is performed, if the cell having the third location area information is not included in the result of the cell search.

3. The method of claim 2, further comprising:
determining a reception signal strength of the cell having the third location area information is equal to or stronger than a predetermined reference value, if the cell having the third location area information is included in the result of the cell search; and
determining a cell, of which a reception signal strength is the strongest, among the cells having the third location area information identical to the second location area information of the cell used just before forming the call, as the cell to which the cell selection is performed, if the reception signal strength of the cell having the third location area information is equal to or stronger than the predetermined reference value.

4. The method of claim 1, wherein the first location area information includes a first location area code (LAC), and the second location area information includes a second LAC.

5. The method of claim 1, wherein the stored information includes at least one of frequency information, universal terrestrial radio access absolute radio frequency channel number (UARFCN) information and primary scramble code (PSC) information of the cell to which the camp-on is performed.

6. A terminal for selecting a cell in a wireless communication system, the terminal comprising:
a transceiver configured to perform a wireless communication with a base station;
memory configured to store information on at least one cell having been used before a call and a cell used just before forming the call; and
a processor configured to:
perform, if an end of the call is detected, a cell search based on a cell used during the call and the stored information on the at least one cell having been used before a call and a cell used just before forming the call,
determine, based on a result of the cell search and the cell used just before forming the call, the cell to which the cell selection is performed, the determining of the cell comprising:
comparing first location area information of a cell of which a reception signal strength is the strongest according to the result of the cell search with second location area information of the cell used just before forming the call, and
determining the cell of which the reception signal strength is the strongest as the cell to which the cell selection is performed, if the first location area information is identical to the second location area information, as a result of the comparison; and
select, by the terminal, the determined cell.

7. The terminal of claim 6, wherein the processor is further configured to:
determine whether a cell having third location area information identical to the second location area information is included in the result of the cell search, if the first location area information is not identical to the second location area information, as the result of the comparison, and
determine the cell of which the reception signal strength is the strongest as the cell to which the cell selection is performed, if the cell having the third location area information is not included in the result of the cell search.

8. The terminal of claim 7, wherein the processor is further configured to:
determine that a reception signal strength of the cell having the third location area information is equal to or stronger than a predetermined reference value, if the cell having the third location area information is included in the result of the cell search, and
determine a cell, of which a reception signal strength is the strongest, among the cells having the third location area information identical to the second location area information of the cell used just before forming the call, as the cell to which the cell selection is performed, if the reception signal strength of the cell having the third location area information is equal to or stronger than the predetermined reference value.

9. The terminal of claim 7, wherein the first location area information includes a first location area code (LAC), and the second location area information includes a second LAC.

10. The terminal of claim 6, wherein the stored information includes at least one of frequency information, universal terrestrial radio access absolute radio frequency channel number (UARFCN) information and primary scramble code (PSC) information of the cell to which the camp-on is performed.

11. The terminal of claim 6,
wherein the processor is configured to determine whether there are any cells that satisfy a reference value, and
wherein, if the processor determines that there are cells that satisfy the reference value, the processor is further configured to perform the cell selection by targeting the cell of which the reception signal strength is the strongest, among the cells satisfying the reference value.

* * * * *